United States Patent
Chiang et al.

(10) Patent No.: US 9,047,072 B2
(45) Date of Patent: Jun. 2, 2015

(54) SYSTEM AND METHOD FOR MANAGING POWER SUPPLY UNITS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Ren-Hong Chiang, New Taipei (TW); Dun-Hong Cheng, Shenzhen (CN); Jin-Xiu Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 334 days.

(21) Appl. No.: 13/730,677

(22) Filed: Dec. 28, 2012

(65) Prior Publication Data

US 2013/0290745 A1    Oct. 31, 2013

(30) Foreign Application Priority Data

Apr. 27, 2012  (CN) .......................... 2012 1 0127277

(51) Int. Cl.
*G06F 1/00* (2006.01)
*G06F 1/26* (2006.01)
*G06F 1/30* (2006.01)

(52) U.S. Cl.
CPC .................. *G06F 1/26* (2013.01); *G06F 1/263* (2013.01); *G06F 1/30* (2013.01)

(58) Field of Classification Search
CPC ............. G06F 1/26; G06F 1/263; G06F 1/30; G06F 1/3296
USPC .................................................. 713/300, 340
See application file for complete search history.

(56) References Cited

U.S. PATENT DOCUMENTS

| | | | | |
|---|---|---|---|---|
| 5,652,893 | A * | 7/1997 | Ben-Meir et al. | 713/310 |
| 5,754,798 | A * | 5/1998 | Uehara et al. | 710/104 |
| 8,769,313 | B2 * | 7/2014 | Bi et al. | 713/300 |
| 2003/0056125 | A1 * | 3/2003 | O'Conner et al. | 713/300 |
| 2003/0085621 | A1 * | 5/2003 | Potega | 307/18 |
| 2011/0025129 | A1 * | 2/2011 | Humphrey et al. | 307/64 |

* cited by examiner

*Primary Examiner* — Mark Connolly
(74) *Attorney, Agent, or Firm* — Novak Druce Connolly Bove + Quigg LLP

(57) ABSTRACT

A power supply management system includes a power supply backplane, a plurality of power supply units connected to the power supply backplane, and a power controller chip. The power controller chip sends a plurality of power controlling signals to the power supply backplane. The power supply backplane transmits the plurality of power controlling signals to the plurality of power supply units, transition the plurality of power supply units into specific working states according to the plurality of power controlling signals, collect present working states of the plurality of power supply units, and sends the present working states of the plurality of power supply units to the power controller chip. A method for managing power supply units is also provided.

20 Claims, 4 Drawing Sheets

SYSTEM AND METHOD FOR MANAGING POWER SUPPLY UNITS

REFERENCE TO RELATED APPLICATIONS

This application claims all benefits accruing under 35 U.S.C. §119 from China Patent Application No. 201210127277.1, filed on Apr. 27, 2012 in the State Intellectual Property Office of China. The contents of the China Application are hereby incorporated by reference.

BACKGROUND

1. Technical Field

The disclosure generally relates to power management, and more particularly relates to a system and method for managing power supply units.

2. Description of Related Art

With the advent of power-hungry information handling systems, power management has become more important. In the past, power conservation has often been a secondary consideration to speed and processor availability. However, due to the increased processing demands required by modern information handling systems, more information handling systems utilize multi-processor systems and/or multiple-blade systems that require more power to operate than single-processor computer systems. In addition, as processor designs continue to scale up in speed and density, corresponding power consumption can increase dramatically. In certain applications (e.g., Internet servers), multiple redundant power supplies are often employed to reduce or eliminate downtime in the event of a power supply failure, requiring more efficient power management.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
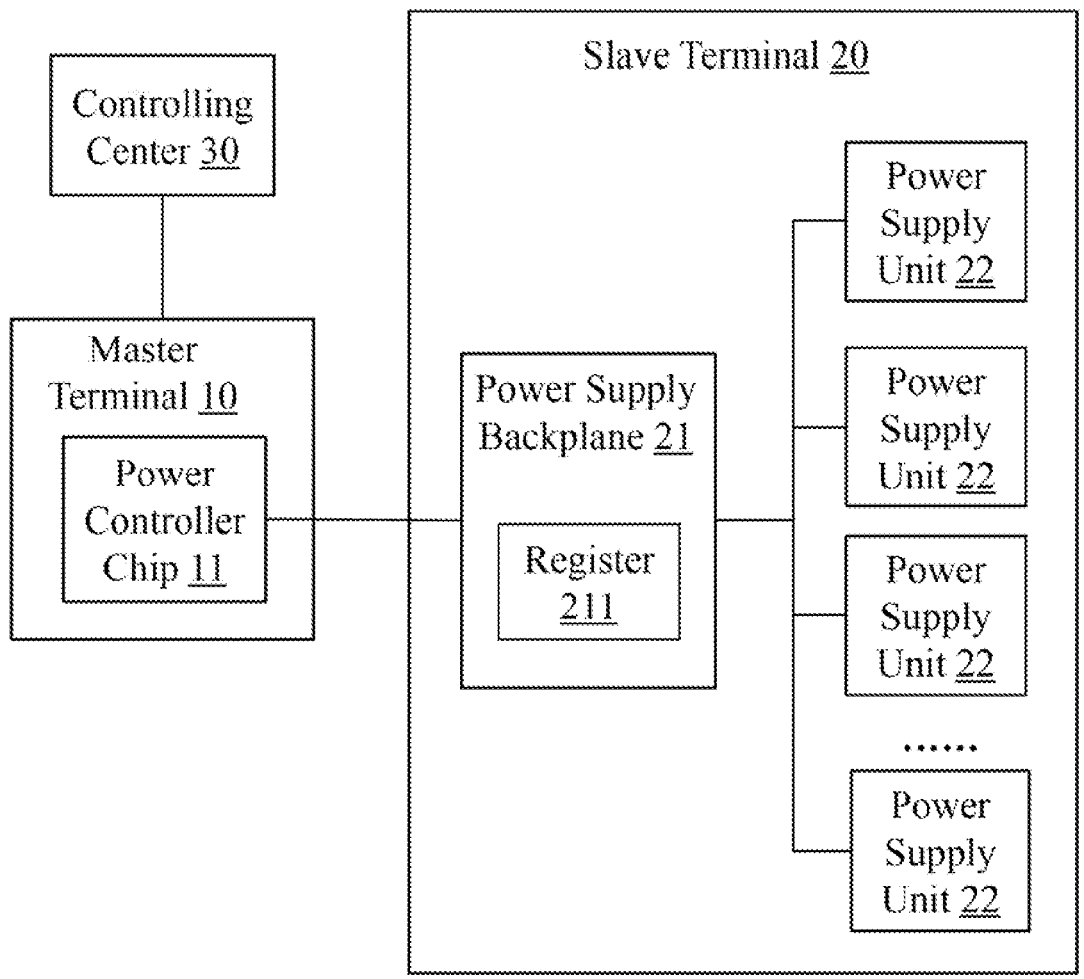
FIG. 1 is a block diagram of a power supply management system in accordance with one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives.

FIG. 1 shows a power supply management system in accordance with one embodiment. The power supply management system includes a master terminal 10, a slave terminal 20, and a controlling center 30. The master terminal 10 may control and manage the slave terminal 20. The controlling center 30 may monitor the working state of the master terminal 10 and the slave terminal 20.

The master terminal 10 is connected to the controlling center 30. The master terminal 10 includes a power controller chip 11. The power controller chip 11 may report its working state to the controlling center 30 at set intervals, such as every five seconds. If the controlling center 30 has not received any report pertaining to the working state of the power controller chip 11 in a preset time period, such as in thirty seconds, the controlling center 30 may determine that the power controller chip 11 is in an abnormal working state and further notify a system administrator by producing an alert, such as sending an email, dialing a phone call, or performing an action in other form.

The slave terminal 20 includes a power supply backplane 21 and a plurality of power supply units 22. Each of the plurality of power supply units 22 is connected to the power supply backplane 21. The power supply backplane 21 includes a register 211. The power supply backplane 21 is connected to the power controller chip 11 of the master terminal 10.

The power controller chip 11 may sends one or more power controlling signals to the power supply backplane 21. Each power controlling signal may corresponds to one of the plurality of power supply units 22 and may control the corresponding power supply unit 22 to power on/off or change power supply voltage.

When the power supply backplane 21 has received the one or more power controlling signals from the power controller chip 11, the power supply backplane 21 transmits each received power controlling signal to the corresponding power supply unit 22. When one of the plurality of power supply units 22 receives a power controlling signal from the power supply backplane 21, the power supply unit 22 is transitioned into a specified working state according to the received power controlling signal. When the power supply unit 22 has changed its working state, the power supply unit 22 may report its present working state to the power supply backplane 21. When the power supply backplane 21 receives the working state of the power supply unit 22, the power supply backplane 21 may store the working state of the power supply unit 22 in the register 211 and may asynchronously transmit the working state of the power supply unit 22 to the power controller chip 11 of the master terminal 10.

The power controller chip 11 may generate one or more new power controlling signals that are configured to transition one or more power supply units 22 to a new working state, according to the present working states of the plurality of power supply units 22. The power controller chip 11 sends the one or more new power controlling signals to the power supply backplane 21. The power supply backplane 21 sends the one or more new power controlling signals to the corresponding one or more power supply units 22. When one power supply unit 22 receives a new power controlling signal, it changes its working state according to the received new power controlling signal.

The controlling center 30 may further actively obtain the working states of the plurality of power supply units 22 from the master terminal 10. The controlling center 30 may establish a connection with the master terminal 10 via a network, such as LAN or Internet, or other data bus, such as IIC (Inter-Integrated Circuit) bus. The controlling center 30 may be a desktop computer, a notebook computer, a server computer, a smartphone, or the like.

The master terminal 10 may be an IMM (Infrastructure Management Module) and the power controller chip 11 may be a BMC (Baseboard Manage Control) chip integrated within the IMM.

The plurality of power supply units 22 may be connected to the power supply backplane 21 via a variety of bus types, such as IIC bus, SPI (Serial Peripheral Interface) bus, and the like.

Figure 2:
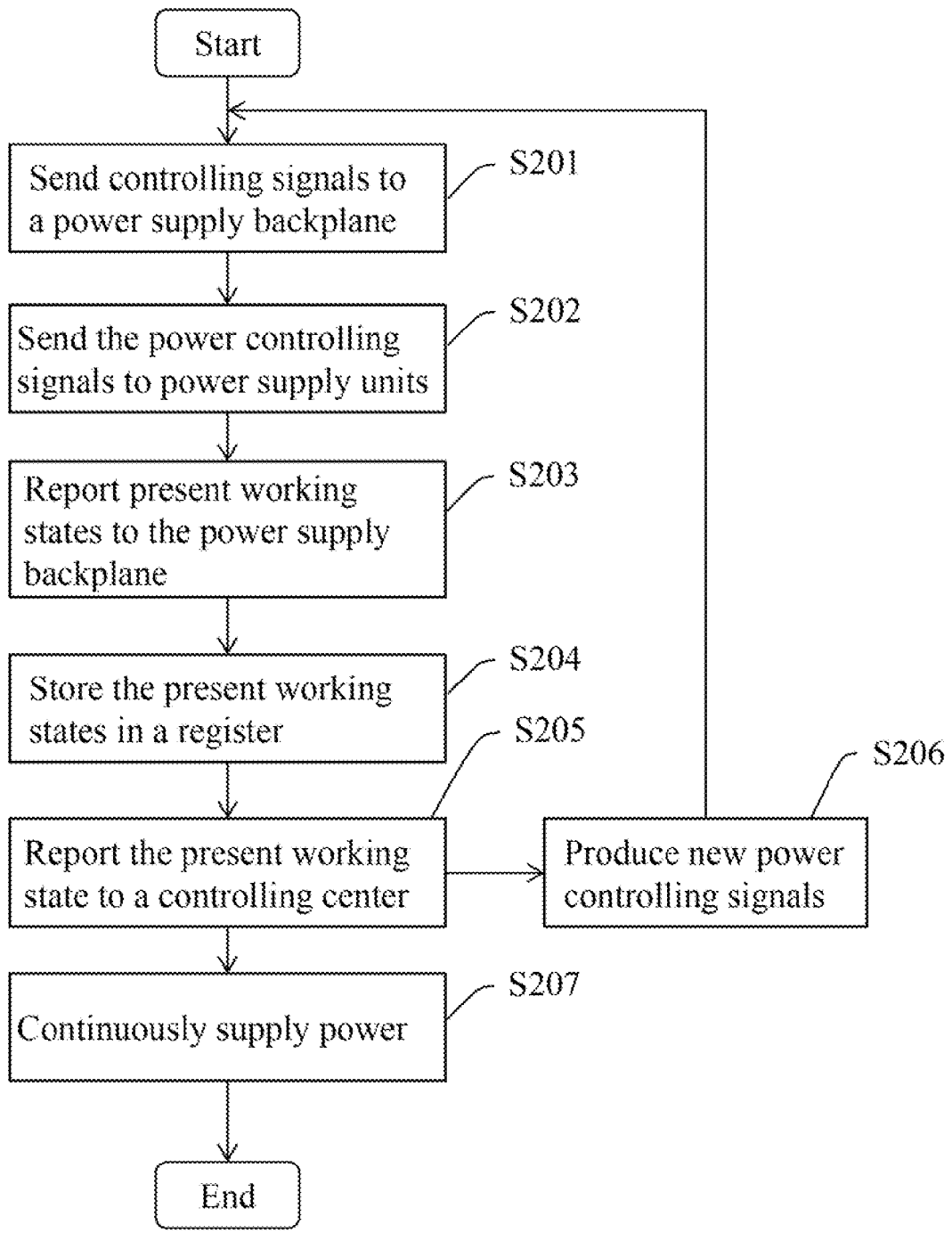
FIG. 2 is a flowchart showing one embodiment of a method for managing power supply units.

FIG. 2 is a flowchart showing one embodiment of a method for managing the power supply units 22. The method comprises the following steps.

In step S201, the power controller chip 11 of the master terminal 10 sends one or more power controlling signals to the power supply backplane 21. Each of the one or more power controlling signals corresponds to one of the plurality of power supply units 22.

In step S202, the power supply backplane 21 transmits the one or more power controlling signals to the corresponding one or more power supply units 22.

In step S203, the one or more power supply units 22 change their working states according to the one or more power controlling signals and report their present working states to the power supply backplane 21.

In step S204, the power supply backplane 21 stores the present working states of the one or more power supply units 22 in the register 211.

In step S205, the power supply backplane 21 transmits the present working states of the one or more power supply units 22 to the power controller chip 11 of the master terminal 10.

In step S206, the power controller chip 11 generates one or more new power controlling signals that are configured to transition one or more power supply units 22 to a new working state, according to the present working states of the one or more power supply units 22. The flow returns to step S201.

In step S207, the power supply management system continuously supplies power to an information handling system.

Figure 3:
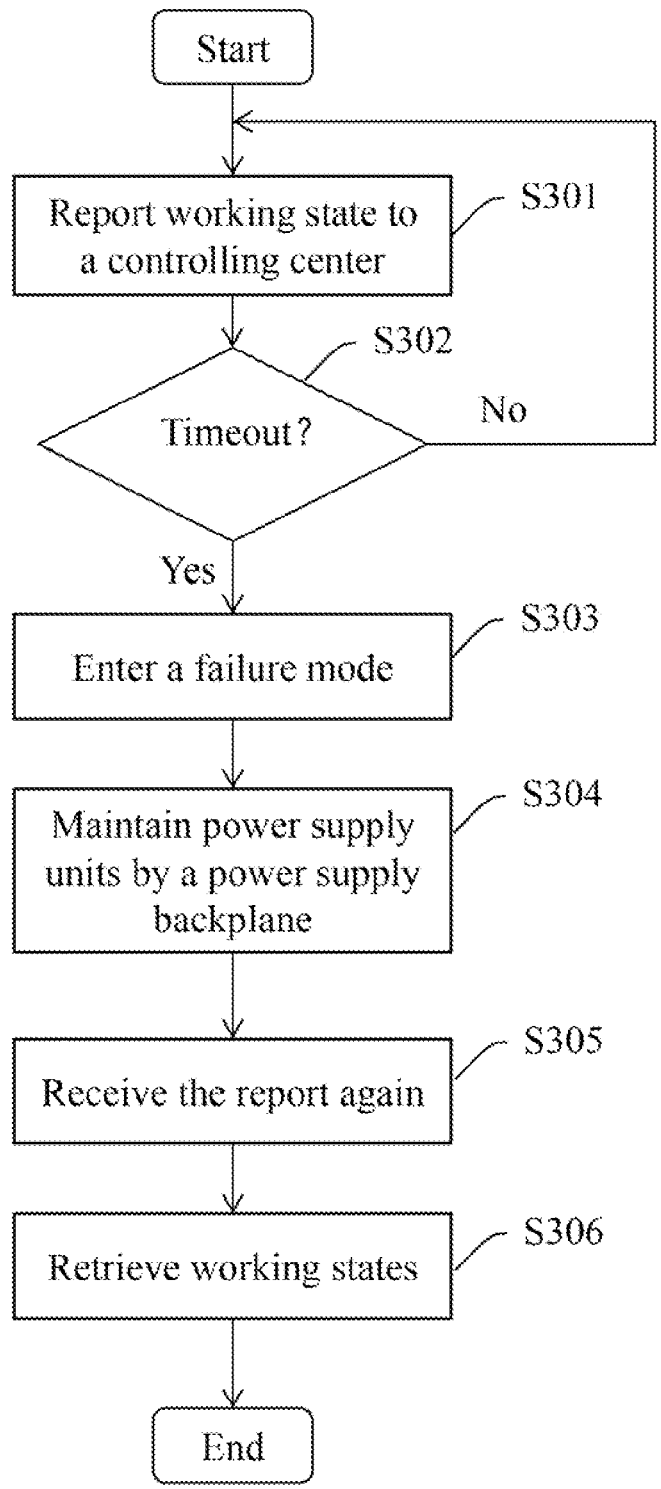
FIG. 3 is a flowchart showing one embodiment of a method for monitoring the working state of a power controller chip of the power supply management system of FIG. 1.

FIG. 3 is a flowchart showing one embodiment of a method for monitoring the working state of the power controller chip 11. The method comprises the following steps.

In step S301, the power controller chip 11 sends a report pertaining to the present working state of the power controller chip 11 to the controlling center 30 at set time intervals.

In step S302, the controlling center 30 determines whether it has not received any report from the power controller chip 11 in a preset time period. If the controlling center 30 has not received any report from the power controller chip 11 in a preset time period, the flow goes to step S303; otherwise, the flow goes to step S301.

In step S303, the controlling center 30 enters a failure mode. When in the failure mode, the controlling center 30 notifies the system administrator by producing an alert, sending an email, dialing a phone call, or performing an action in other form.

In step S304, the power supply backplane 21 maintains the plurality of power supply units 22 in the working states which are stored in the register 211.

In step S305, the controlling center 30 detects that the power controller chip 11 resumes to normally work when the controlling center 30 receives the report pertaining the working state of the power controller chip 11 again.

In step S306, the power controller chip 11 retrieves the working states of the plurality of power supply units 22 that are stored in the register 211 of the power supply backplane 21.

Figure 4:
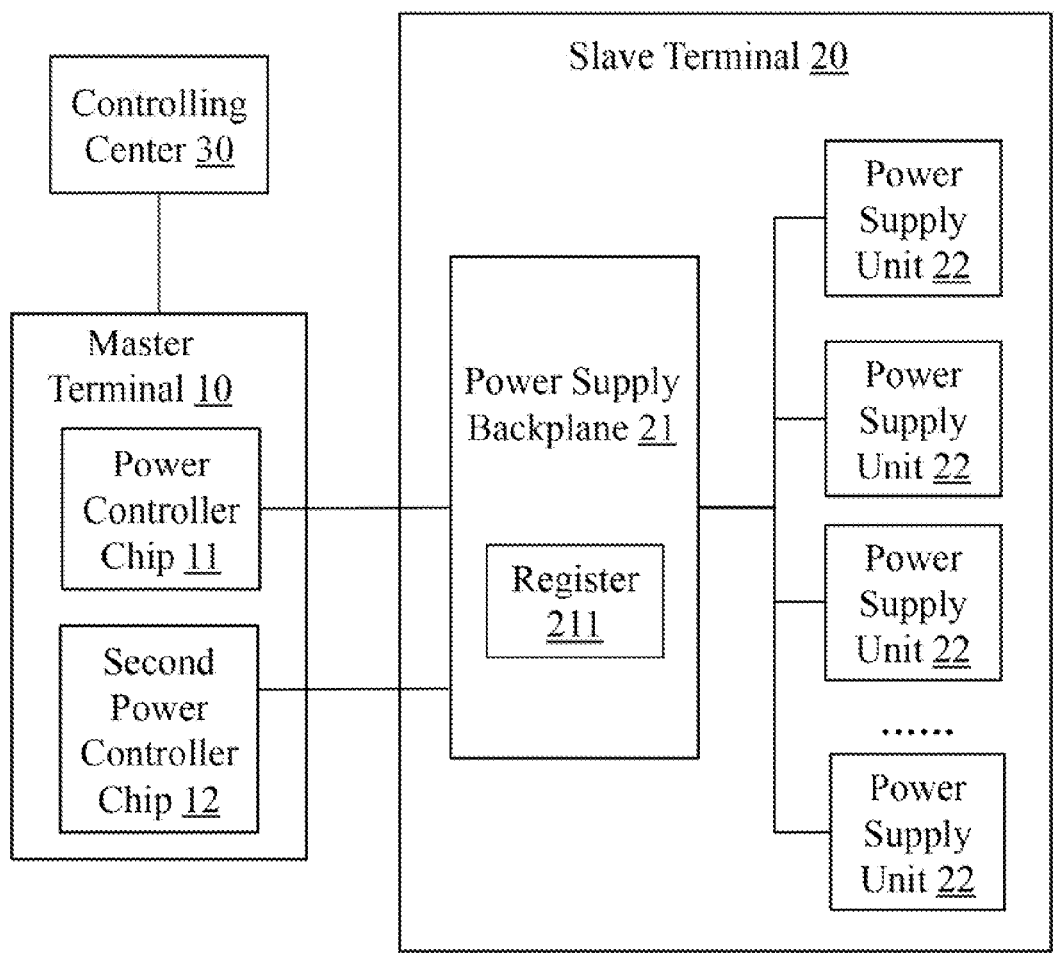
FIG. 4 is a block diagram of a second power supply management system in accordance with another embodiment.

FIG. 4 shows a second power supply management system in accordance with another embodiment. The second power supply management system includes all the components of the power supply management system illustrated in FIG. 1. In addition, the master terminal 10 of the FIG. 4 further includes a second power controller chip 12 connected to the slave terminal 20. When the power supply management system is in a normal mode, the power controller chip 11 has control of the plurality of power supply units 22 and the second power controller chip 12 is idle. When the power supply management system is in a failure mode, the second power controller chip 12 retrieves the working states of the plurality of power supply units 22 from the register 211 and takes control of the plurality of power supply units 22. When the power controller chip 11 resumes to normally working, the second power controller chip 12 hands over control of the plurality of power supply units 22 to the power controller chip 11.

Although numerous characteristics and advantages have been set forth in the foregoing description of embodiments, together with details of the structures and functions of the embodiments, the disclosure is illustrative only, and changes may be made in detail, especially in the matters of arrangement of parts within the principles of the disclosure to the full extent indicated by the broad general meaning of the terms in which the appended claims are expressed.

In particular, depending on the embodiment, certain steps or methods described may be removed, others may be added, and the sequence of steps may be altered. The description and the claims drawn for or in relation to a method may give some indication in reference to certain steps. However, any indication given is only to be viewed for identification purposes, and is not necessarily a suggestion as to an order for the steps.

What is claimed is:

1. A power supply management system comprising:
a power supply backplane comprising a register;
a plurality of power supply units connected to the power supply backplane;
a first power controller chip configured to send a plurality of power controlling signals to the power supply backplane;
wherein the power supply backplane is configured to transmit the plurality of power controlling signals to the plurality of power supply units, to transition the plurality of power supply units into specific working states according to the plurality of power controlling signals, to collect present working states of the plurality of power supply units, to store the present working states of the plurality of power supply units in the register, and to send the present working states of the plurality of power supply units to the first power controller chip.

2. The power supply management system of claim 1, wherein the first power controller chip is further configured to generate one or more new power controlling signals that are configured to transition one or more power supply units to a new working state, according to the present working states of the plurality of power supply units.

3. The power supply management system of claim 1, wherein the first power controller chip is further configured to send a report pertaining to a present working state of the first power controller chip to a controlling center at set time intervals.

4. The power supply management system of claim 3, wherein the controlling center is configured to enter a failure mode when the controlling center has not received the report pertaining to the present working state of the first power controller chip in a preset time period.

5. The power supply management system of claim 4, wherein while in the failure mode, the power supply backplane is further configured to maintain the plurality of power supply units in the working states which are stored in the register.

6. The power supply management system of claim 4, wherein while in the failure mode, the controlling center is further configured to notify a system administrator.

7. The power supply management system of claim 4, further comprising a second power controller chip, wherein while in the failure mode, to take control of the plurality of power supply units.

8. The power supply management system of claim 7, wherein while in the failure mode, the second power controller chip is configured to retrieve the working states of the plurality of power supply units from the register.

9. The power supply management system of claim 1, further comprising a second power controller chip, wherein the first power controller chip is further configured to send a report pertaining to a present working state of the first power controller chip to the second power controller chip at set time intervals.

10. The power supply management system of claim 9, wherein the second power controller chip is further configured to take control of the plurality of power supply units when the second power controller chip has not received the report pertaining to the present working state of the first power controller chip in a preset time period.

11. A method for managing power supply units, the method comprising:
sending a plurality of power controlling signals to a power supply backplane by a first power controller chip;
transmitting the plurality of power controlling signals to a plurality of power supply units by the power supply backplane;
transitioning the plurality of power supply units into specific working states in response to the plurality of power controlling signals;
reporting present working states of the plurality of power supply units to the power supply backplane;
storing the present working states of the plurality of power supply units in a register of the power supply backplane; and
sending the present working states of the plurality of power supply units to the first power controller chip.

12. The method of claim 11, further comprising generating one or more new power controlling signals that transition one or more power supply units to a new working state, according to the present working states of the plurality of power supply units by the first power controller chip.

13. The method of claim 11, further comprising sending a report pertaining to a present working state of the first power controller chip to a controlling center at set time intervals.

14. The method of claim 13, further comprising entering a failure mode when the controlling center has not received the report pertaining to the present working state of the first power controller chip in a preset time period.

15. The method of claim 14, further comprising, while in the failure mode, maintaining the plurality of power supply units in the working states which are stored in the register.

16. The method of claim 14, further comprising, while in the failure mode, notifying a system administrator by the controlling center.

17. The method of claim 14, further comprising, while in the failure mode, taking control of the plurality of power supply units by a second power controller chip.

18. The method of claim 17, further comprising, while in the failure mode, retrieving the working states of the plurality of power supply units from the register by the second power controller chip.

19. The method of claim 11, further comprising sending a report pertaining to a present working state of the first power controller chip to a second power controller chip at set time intervals by the first power controller chip.

20. The method of claim 19, further comprising taking control of the plurality of power supply units by the second power controller chip when the second controller chip has not received the report pertaining to the present working state of the first power controller chip in a preset time period.

* * * * *